(12) United States Patent
Marshall et al.

(10) Patent No.: US 6,931,740 B2
(45) Date of Patent: Aug. 23, 2005

(54) LINE GENERATING DEVICE

(75) Inventors: James D. Marshall, Mallorytown (CA); Oleksiy P. Sergyeyenko, Brockville (CA); Richard J. Heavel, Hanover, PA (US); Terry L. Turner, Westminster, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/822,626

(22) Filed: Apr. 12, 2004

(65) Prior Publication Data

US 2004/0216313 A1 Nov. 4, 2004

Related U.S. Application Data

(60) Provisional application No. 60/469,160, filed on May 9, 2003, and provisional application No. 60/466,685, filed on Apr. 30, 2003.

(51) Int. Cl.[7] .......................... G01C 15/02; G01B 11/26
(52) U.S. Cl. ....................... 33/286; 33/370; 248/222.52
(58) Field of Search .......................... 33/286, 227, 281, 33/282, 283, 285, 347, 370, DIG. 21, 451; 248/682, 220.21, 222.13, 222.52, 223.41, 224.51, 224.61

(56) References Cited

U.S. PATENT DOCUMENTS

| | | | | | |
|---|---|---|---|---|---|
| 5,063,679 A | * | 11/1991 | Schwandt | ..................... | 33/347 |
| 5,782,003 A | * | 7/1998 | Bozzo | .......................... | 33/286 |
| 6,398,179 B1 | * | 6/2002 | Soles | .................... | 248/222.52 |
| 6,502,319 B1 | * | 1/2003 | Goodrich et al. | ............. | 33/286 |
| 6,577,388 B2 | * | 6/2003 | Kallabis | ....................... | 33/286 |
| 6,735,879 B2 | * | 5/2004 | Malard et al. | ................ | 33/286 |
| 2002/0066191 A1 | * | 6/2002 | Hsu | ............................ | 33/286 |

* cited by examiner

Primary Examiner—Christopher W. Fulton
(74) Attorney, Agent, or Firm—Wesley W. Muller; Bruce S. Shapiro

(57) ABSTRACT

A line generating device may include a housing, a support assembly mounted within the housing, a light source mounted on the support assembly, a lens mounted on at least one of the support assembly and the light source, the lens receiving light and projecting the light in the shape of a fan within a plane, and a first level vial mounted on the support assembly, wherein the first level vial is coplanar or perpendicular to the plane. The device may also include a magnet mounted on the support assembly.

20 Claims, 3 Drawing Sheets

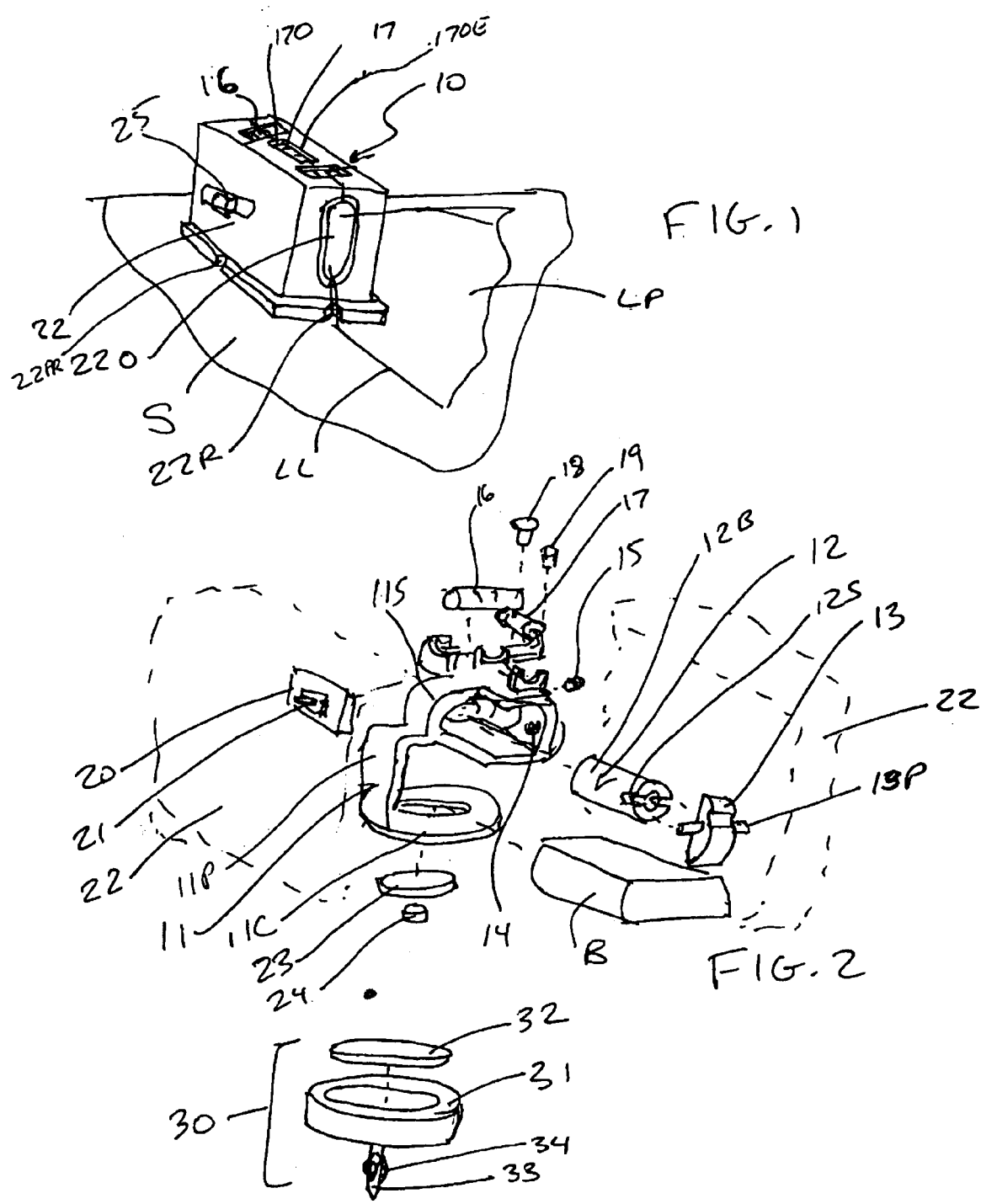

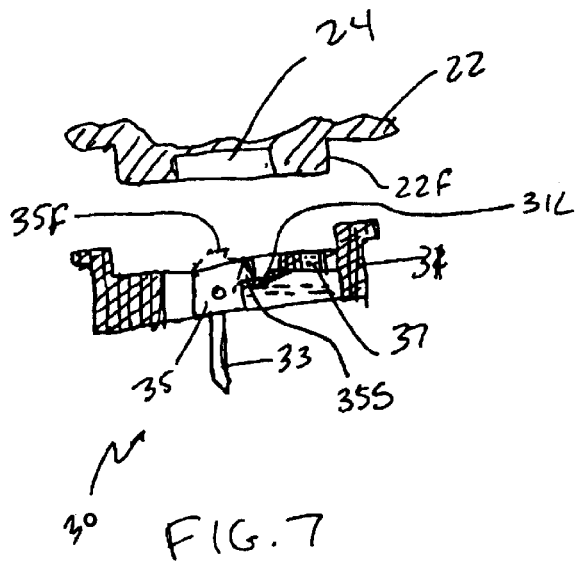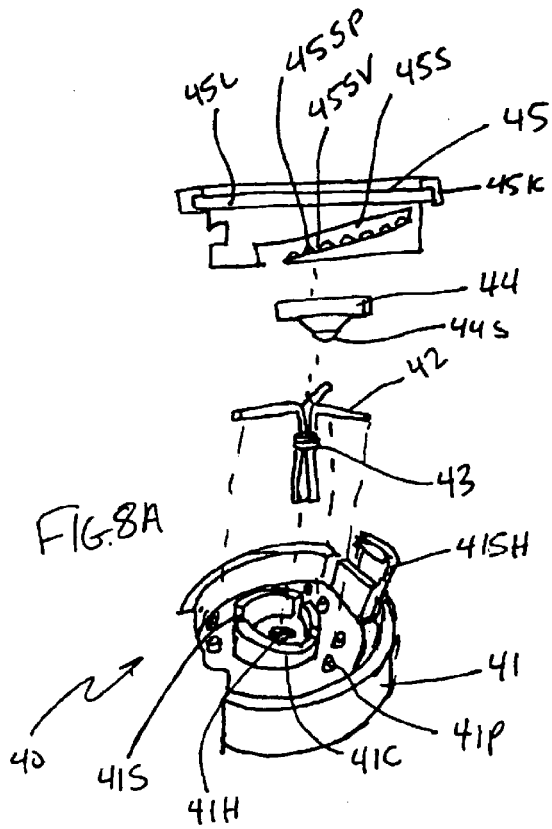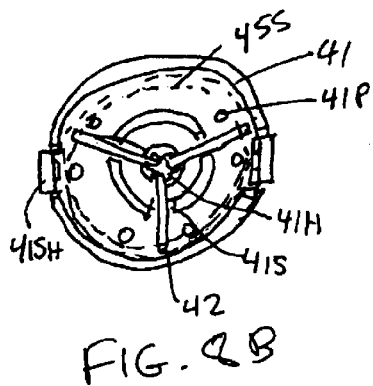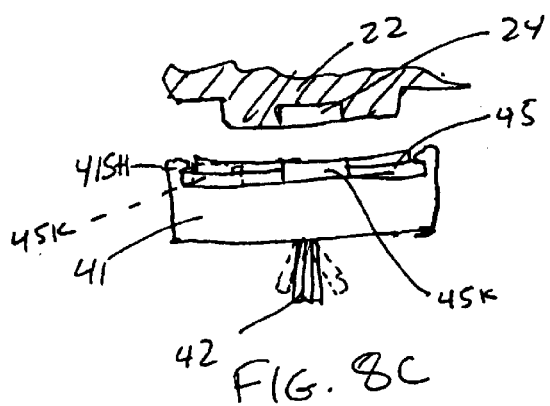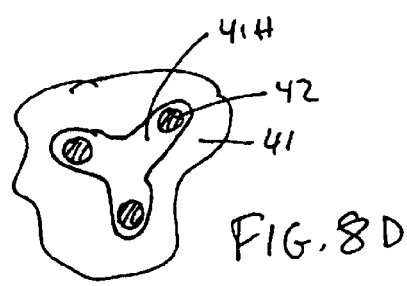

LINE GENERATING DEVICE

CROSS-REFERENCE TO RELATED APPLICATIONS

The present application derives priority from U.S. application Ser. No. 60/469,160, filed on May 9, 2003, now pending, and U.S. application Ser. No. 60/466,685, filed on Apr. 30, 2003, now pending.

FIELD OF THE INVENTION

The present invention generally relates to line generating devices and more specifically to laser line generating devices.

BACKGROUND OF THE INVENTION

In the construction industry, it is well known to use laser levels for marking reference lines to be used in the layout of different features in a room or structure. Most of these laser levels are expensive due to the optics and electronics involved therein. Accordingly, it is an object of the invention to provide a line generating device that is less expensive to manufacture than the prior art laser levels.

SUMMARY OF THE INVENTION

In accordance with the present invention, an improved line generating device is employed. The line generating device may include a housing, a support assembly mounted within the housing, a light source mounted on the support assembly, a lens mounted on at least one of the support assembly and the light source, the lens receiving light and projecting the light in the shape of a fan within a plane, and a first level vial mounted on the support assembly, wherein the first level vial is coplanar or perpendicular to the plane.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a perspective view of line generating device constructed in accordance with the teachings of the present invention;

FIG. 2 is an exploded perspective view of the line-generating device of FIG. 1;

FIG. 4 illustrates different means for adjusting one of the level vials disposed on the frame assembly; whereas

FIG. 7 is a cross-section of an alternate embodiment of the pin assembly; and

FIG. 8 illustrates a wall mounting assembly, where FIGS. 8A–8C are exploded, partial top plan and side views, respectively, and FIG. 8D is an enlarged top plan view of the hole in the assembly.

DETAILED DESCRIPTION

Figure 3:
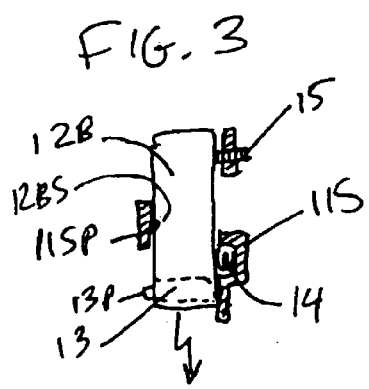
FIG. 3 is a partial cross section illustrating the adjustment means for adjusting the laser barrel.

With reference to FIGS. 1 and 2, a line-generating device constructed in accordance with the teachings of the present invention is generally indicated by reference numeral 10. Line generating device 10 may comprise a frame assembly 11, a diode assembly 12, a lens 13 mounted onto the diode barrel 12, level vials 16, 17 mounted on frame assembly 11, printed circuit board 20, with a switch 21 mounted thereon, battery B received on the frame assembly 11, a switch actuator 25 for actuating switch 21, and a housing 22 for receiving for enclosing most, if not all, of the elements described above.

Frame assembly 11 is preferably made of metal, such as magnesium or zinc. Frame assembly 11 preferably has a substantially horizontal planar support 11C, a substantially vertical post 11P connected to planar support 11C, and support section 11S for receiving and/or supporting several components. Preferably, support portion 11S receives and supports diode assembly 12 and/or level vials 16, 17.

Battery B may be disposed between planar support 11C and support portion 11S. Battery B may be a 9 volt battery.

As mentioned above, diode assembly 12 may be disposed into support portion 11S. Preferably, diode assembly 12 has a laser diode (not shown) and/or a collimating lens (not shown). The laser diode and/or the collimating lens may be disposed in a barrel 12B.

A projection lens 13 may be disposed in front of the laser diode and/or the diode assembly 12. Preferably, lens 13 is substantially cylindrical, so that it can receives the light from the laser diode and project it in the shape of a fan.

Barrel 12B may have slots 12S for receiving pins 13P protruding from cylindrical lens 13. Persons skilled in the art will recognize that cylindrical lens 13 may be mounted unto barrel 12B and/or support portion 11S using other means. The diode assembly 12 and the cylindrical lens 13 will generate a laser light plane LP which, will generate a laser line LL on a surface S, as shown in FIG. 1.

Referring to FIGS. 2 and 3, the diode assembly 12 and cylindrical lens 13 are received within the support portion 11S of frame assembly 11. It is preferable to provide a means for adjusting the diode assembly 12 relative to frame assembly 11.

One such mechanism includes a spring 14, which is preferably captured between barrel 12B and support portion 11S, a set screw 15 threadingly engaged to support portion 11S, and pivot portion 11SP formed by part of the support portion 11S disposed between the spring 14 and set screw 15. It may be preferable to dispose a slot 12BS on barrel 12B to engage the pivot portion 11SP.

With such arrangement, when the set screw 15 is rotated, barrel 12B will preferably pivot about the pivot portion 11SP. If set screw 15 is rotated in the other direction, spring 14 will cause rotation of the barrel 12B about pivot portion 11SP.

It is preferable to provide some fixing compound, such as Loc-Tite, on set screw 15 so that, once the adjustment has been accomplished, the location of barrel 12B (and thus of diode assembly 12) will be fixed.

It is also preferable to provide potting adhesive in a number of location between barrel 12B and support portion 11S. Rapid cure adhesive may work well for such application.

In order for the user to be able to determine the relationship of light LL relative to a reference plane, it is preferable to provide level vials 16, 17 on line generating device 10. Level vial 16 is preferably disposed on frame assembly 11 so that, when line generating device 10 is substantially vertically on a vertical wall, level vial 16 will show the degree of verticality of line generating device 10. Similarly, level vial 17 will be disposed on frame assembly 11 so that, when the line generating device 10 is disposed substantially horizontally against a vertical wall, level vial 17 will show the degree of horizontality of line generating device 10. It is thus preferable to adjust the level vials 16, 17 relative to the laser plane LP so that level vials 16, 17 will provide an accurate reading thereof.

Figure 4A:
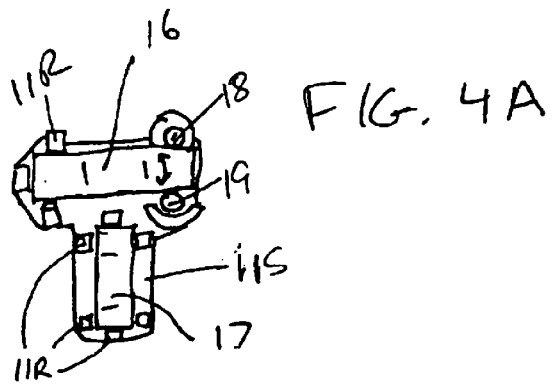
FIGS. 4A–4B are the first and second embodiments, respectively.

Referring to FIGS. 2 and 4A, it is preferable to dispose level vial 17 on support portion 11S. Preferably, level vial 17 will be captured between ribs 11R on support portion 11S. Similarly, one end of level vial 16 may be captured within ribs of 11R disposed on support portion 11S. In order to adjust level vial 16 relative to frame assembly 11 and/or level vial 17, it is preferable to provide a ramp screw head 18, which threadingly engages support portion 11S and contacts the other end of level vial 16. On the other side of level vial 16, it is preferable to provide a compression plug 19. Accordingly, by rotating ramp screw head 18, the level vial 16 can be rotated to the appropriate position.

Figure 4B:
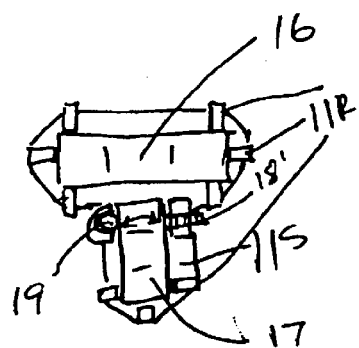

FIG. 4B illustrates a different method of adjusting level vials 16, 17. In this embodiment, level vial 16 is captured between ribs 11R on support portion 11S. Level vial 17 is captured at one end by ribs 11R as well. At the other end, the set screw 18' is threadingly engaged to support portion 11S and contacts one side of level vial 17. Compression plug 19 is disposed on the other side of level vial 17. Accordingly, the level vial 17 can be adjusted by rotating set screw 18'.

Persons skilled in the art will recognize that it may be preferable to secure level vial 16, 17 unto support portion 11S with potting adhesive. Further ribs can be added if necessary.

Persons skilled in the art will recognize that level vial 17 is preferably fixed on frame assembly 11, barrel 12B is then adjusted and locked relative to level vial 17, and level vial 16 is adjusted and locked relative to barrel 12B and/or the laser plane LP. Persons skilled in the art will also recognize that level vial 16 may be fixed on frame assembly 11, barrel 12B is then adjusted and locked relative to level vial 16, and level vial 17 is adjusted and locked relative to barrel 12B and/or the laser plane LP. Preferably, such adjustments will be conducted when device 10 is placed on a substantially vertical surface.

As discussed above, frame assembly 11, diode assembly 12 and level vial 16, 17 are at least partially enclosed by housing 22. Housing 22 preferably comprises two clamshell halves which define an opening 22O for allowing the laser light plane LP to exit from housing 22. Furthermore, housing 22 may have openings such as 17O for allowing the user to see the level vial 16, 17. Preferably, the edge of the openings are such as 17OE are beveled or inclined to maximize this ability of the level vial 16 and/or 17.

Housing 22 may have a reference indicia 22R, which is preferably coplanar with light plane LP.

Persons skilled in the art will recognize that it is preferable to dispose any electronics necessary to power the laser diode are preferably disposed on printed circuit board 20. For example, a switch 21 may be disposed on the printed circuit board 20 for controlling the flow of power to the laser diode. A switch actuator 25 may be disposed on housing 22 for actuating switch 21, allowing the user to turn the laser diode (and thus the line generating device 10) on and/or off.

Figure 5:
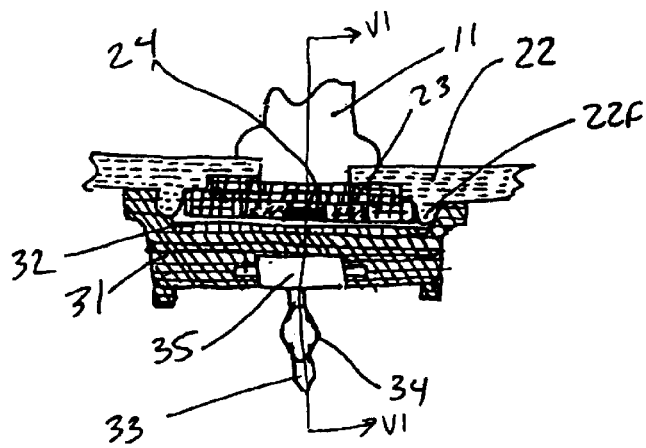
FIG. 5 is a partial cross section showing the line-generating device in combination with the pin assembly.

Referring to FIGS. 2 and 5, a magnet 24 may be placed and glued onto a magnet holder 23, which is preferably disposed on the planar support 11C of frame assembly 11. Preferably, housing 22 does not cover magnet 24. Persons skilled in the art will recognize that providing magnet 24 will enable the user to dispose device 10 onto a ferrous surface, etc.

Figure 6:
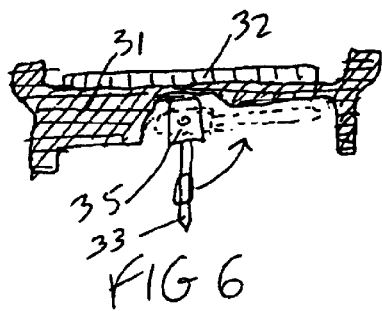
FIG. 6 is a cross-section of the pin assembly along line VI—VI of FIG. 5.

Referring to FIGS. 2 and 5–6, line generating device 10 is preferably used with a pin assembly 30. Pin assembly 30 may include a body 31, a metal plate 32 disposed in body 31 and a pin 33 connected to body 31. Preferably, pin 33 is attached to pivoting body 35, which is in turn pivotally attached to body 31. With such construction, pin 33 can be extended into a position where it can be inserted into drywall or retracted into a folded position within main body 31, as shown in FIG. 6 in solid and broken lines, respectively.

Persons skilled in the art will recognize that at least one of the pivoting body 35 and body 31 will have a small protrusion (not shown) engaging a hole or notch (not shown) in the other of the pivoting body 35 and body 31, in effect providing a detent for maintaining the pin 33 in the extended and/or retracted positions. Persons skilled in the art will know how to design such detent so that it maintains the pin 33 in the extended position when the user is inserting pin 33 into drywall. Persons skilled in the art will also know how to design such detent so that it allows pin 33 to move into the folded position when pin assembly 30 is dropped unto the floor, etc.

Housing 22 may have flanges 22F which engage the inside of main body 31. Alternatively, pin assembly 30 may be disposed on housing 22 and held in place via the magnetic relationship between magnet 24 and metal plate 32. Persons skilled in the art will recognize that magnet 24 may be disposed on the pin assembly 30 and metal plate may be disposed on housing 22.

With such arrangement, the user can dispose line generating device on a wall by inserting pin assembly 30 into the wall and then disposing line generating device 10 on pin assembly 30. It may be preferable to provide a flat portion 34 on pin 33 to prevent the pin 33 (and thus pin assembly 30) from rotating when inserted into drywall, etc.

It is preferable that the pin 33 be coplanar with laser light plane LP. Persons skilled in the art may recognize that, due to this coplanarity, reference indicia 22R will also be coplanar with pin 33. Furthermore, housing 22 may have reference indicia 22PR which is coplanar with pin 33 along a plane which is substantially perpendicular with laser light plane LP.

This is because the user can dispose line generating device 10 on a wall or surface to mark a first line laser line, rotate line generating device 10 about pin 33 to a second position and mark a second laser line on surface S. Then when line generating device 10 and pin assembly 30 are removed, the user will be able to determine where the two laser lines meet by locating the hole created in surface S by pin 33.

It may be preferable to provide a friction means on the wall side of main body 31 to reduce the chance of rotation of main body 31 relative to the wall. Such friction means could include rubber buttons, adhesive disks etc.

FIG. 7 illustrates another embodiment of the pin assembly 30, where like numbers refer to like parts. Persons skilled in the art will recognize that the teachings of the previous embodiment are hereby incorporated by reference.

As before, pin assembly 30 may include a body 31 and a pin 33 connected to body 31. Preferably, pin 33 is attached to pivoting body 35, which is in turn pivotally attached to body 31. With such construction, pin 33 can be extended into a position where it can be inserted into drywall or retracted into a folded position within main body 31, as shown in FIG. 7 in solid and broken lines, respectively.

Pivoting body 35 may be made of a ferrous material, so that it can be attracted by magnet 24, and thus pin assembly 30 is magnetically attached to device 10. Pivoting body 35 may also have a surface 35S, which contacts ledge 31L of body 31, to limit the angular movement range of pivoting body 35. Persons skilled in the art will recognize that it is preferable to ensure that surface 35S and ledge 31L contact when pin 33 is extended in the desired position.

Pivoting body 35 may also have a surface 35F which, when pin 33 is in the folded position, is adjacent and/or contacting magnet 24. This allows the user to maintain pin assembly 30 on device 10 even when pin 33 is in the folded position.

Pin assembly 30 may also have a magnet 37 on body 31. Pin 33 is preferably made of a ferrous material, and thus can be attracted to magnet 37. Accordingly, magnet 37 can maintain pin 33 in the folded position.

Referring to FIG. 8, device 10 can also be disposed on a wall mounting assembly 40. Preferably, wall mounting assembly 40 includes a main body 41. Main body 41 may receive at least two (preferably three) L-shaped legs 42, which would extend through a hole 41H in main body 41. A coil spring or collar 43 preferably maintains legs 42 together.

Main body 41 may have posts 41P and/or slots 41S in walls 41C, which receive legs 42 and prevent legs 42 from rotating about hole 41H.

Wall mounting assembly 40 may also include a cam ring 45. Cam ring 45 may have at least two (preferably three) inclined slots 45S, which each slot 45S receiving one leg 42.

Cam ring 45 may also have a plate 44. Plate 44 is preferably made of a ferrous material, so that it can be attracted to magnet 24, thus keeping wall mounting assembly 40 in contact with device 10. Plate 44 may also have a substantially spherical portion 44S, which preferably contacts the bends of legs 42. Persons skilled in the art will recognize that spherical portion 44 need not be integral to plate 44 and can thus be a separate element, such as a ball.

Cam ring 45 is preferably disposed unto main body 41. Accordingly, cam ring 45 may have a ledge 45L which is engaged by hooks 41SH of main body 41 for retaining cam ring 45. Preferably, hooks 41 are relatively resilient so that they act as snap hooks. Persons skilled in the art will recognize that ledge 45L and hooks 41SH could also be disposed on main body 41 and cam ring 45, respectively.

Cam ring 45 may also have at least one knob 45K to allow the user to rotate cam ring 45 relative to main body 41.

Persons skilled in the art will recognize that cam ring 45 can be rotated to move legs 42 from a retracted position (shown in solid lines in FIG. 8C) to an expanded position (shown in broken lines in FIG. 8C). This would allow the user to drill a hole in a wall, install the wall mounting assembly 40 unto the wall, and dispose device 10 unto wall mounting assembly 40 for operation. Due to the expanding movement of legs 42, the dimensions of the hole is not critical.

As the user rotates cam ring 45 relative to main body 41, the inclined slots 45S lift the legs 42 in an axial direction. In other words, the legs 42 move along inclined slots and towards spherical portion 44S. Spherical portion 44S in turn provides a central force at or near the bends of legs 42. The force is provided equally to each leg 42. Because legs 42 cannot rotate about the axial direction due to the posts 41P and/or slots 41S, legs 42 rotate towards the expanded position. As torque on the cam ring 45 is increased, the gripping force of legs 42 in the expanded position is increased. Persons skilled in the art will recognize that the user need only rotate cam ring 45 in the opposite direction in order to move legs 42 towards the retracted position.

It is preferable to provide some mechanism for maintaining legs 42 in the expanded position. Slot 45S may be provided with protrusions 45SP along the length of each slot. These protrusions 45SP define valleys 45SV where each leg 42 can remain until leg 42 is moved over the next protrusion 45SP and towards the next valley 45SV.

Persons skilled in the art will recognize that the shape of hole 41H may be designed to limit the rotational movement about the hole 41H. Accordingly, hole 41H may have slots extending from the center of the hole 41H, as shown in FIG. 8D.

Persons skilled in the art may recognize that wall mounting assembly 40 may not just be mounted to a wall, but could be mounted unto other surfaces, such as a power tool housing, etc.

While the invention has been described in this specification and illustrated in the drawings with reference to a preferred embodiment it would be understood by those skilled in the art that various changes may be made and equivalence may be substituted for elements thereof without departing for the scope of the invention as defined in the claims. In addition, many modifications may be made to a particular situation a material to the teachings of the invention without departing from the essential scope thereof. Therefore, it is intended that the invention not be limited to the particular embodiment illustrated by the drawings and described by the specification as the best mode presently contemplated for carrying out this invention, but that the invention will include any embodiments falling within the foregoing description and the appended claims.

What is claimed is:

1. A line generating device comprising:
   a housing;
   a support assembly mounted within the housing;
   a light source mounted on the support assembly;
   a lens mounted on at least one of the support assembly and the light source, the lens receiving light and projecting the light in the shape of a fan within a plane;
   a first level vial mounted on the support assembly, wherein the first level vial is coplanar or perpendicular to the plane; and
   a magnet mounted on the support assembly.

2. The device of claim 1, further comprising a second level vial substantially perpendicular to the first level vial.

3. The device of claim 2, wherein one of the first and second level vials is adjustable relative to the other of the first and second level vials.

4. The device of claim 2, wherein the second level vial is mounted on the support assembly.

5. The device of claim 4, wherein a compression plug is disposed between the support assembly and one of the first and second level vials.

6. The device of claim 1, further comprising a pin assembly comprising a body, a metal portion disposed in the body and a pin connected to the body.

7. The device of claim 6, wherein the pin has a flat portion.

8. The device of claim 6, wherein the metal portion is pivotally attached to the body, and the pin is attached to the metal portion, the pin being movable between a retracted position and an extended position.

9. The device of claim 8, further comprising a pin magnet disposed on the body for magnetically engaging the pin in the retracted position.

10. The device of claim 6, wherein, when the pin assembly is connected to the housing, the pin is coplanar with the plane.

11. The device of claim 6, wherein, when the pin assembly is connected to the housing, the pin is disposed at the intersection of the plane and a center plane bisecting the housing and being substantially perpendicular with the plane.

12. The device of claim 6, wherein the magnet magnetically engages with the metal portion.

13. The device of claim 1, further comprising a mount assembly comprising:
- a body having a first hole;
- at least two L-shaped legs extending through the first hole, the legs being bound together and being rotationally fixed by features on the body;
- a cam ring disposed on the body, the cam ring having at least two inclined slots for correspondingly receiving the at least two legs, and a force member for putting force on the at least two legs.

14. The device of claim 13, wherein the mount assembly further comprises a metal portion disposed on the cam ring for magnetically engaging the magnet.

15. The device of claim 13, wherein one of the inclined slots has protrusions disposed along the length of the slot.

16. The device of claim 13, wherein the force member is a ball bearing.

17. A mount assembly comprising:
- a body having a first hole;
- at least two L-shaped legs extending through the first hole, the legs being bound together and being rotationally fixed by features on the body;
- a cam ring disposed on the body, the cam ring having at least two inclined slots for correspondingly receiving the at least two legs, and a force member for putting force on the at least two legs.

18. The mount assembly of claim 17, wherein the mount assembly further comprises a metal portion disposed on the cam ring.

19. The mount assembly of claim 17, wherein one of the inclined slots has protrusions disposed along the length of the slot.

20. The mount assembly of claim 17, wherein the force member is a ball bearing.

* * * * *